(12) United States Patent
Tsuji

(10) Patent No.: US 12,203,824 B2
(45) Date of Patent: Jan. 21, 2025

(54) SENSOR

(71) Applicant: Murata Manufacturing Co., Ltd., Nagaokakyo (JP)

(72) Inventor: Daiki Tsuji, Nagaokakyo (JP)

(73) Assignee: MURATA MANYFACTURING CO., LTD., Kyoto (JP)

( * ) Notice: Subject to any disclaimer, the term of this patent is extended or adjusted under 35 U.S.C. 154(b) by 280 days.

(21) Appl. No.: 17/951,154

(22) Filed: Sep. 23, 2022

(65) Prior Publication Data
US 2023/0017253 A1    Jan. 19, 2023

Related U.S. Application Data

(63) Continuation of application No. PCT/JP2021/011508, filed on Mar. 19, 2021.

(30) Foreign Application Priority Data

Mar. 27, 2020    (JP) ................................ 2020-057334

(51) Int. Cl.
*G01L 9/00*    (2006.01)
(52) U.S. Cl.
CPC ................... *G01L 9/0072* (2013.01)
(58) Field of Classification Search
CPC .... G01L 9/0072; G01L 9/0042; G01L 9/0075
See application file for complete search history.

(56) References Cited

U.S. PATENT DOCUMENTS

| | | | | |
|---|---|---|---|---|
| 6,260,417 B1 * | 7/2001 | Watanabe | ............ | G01L 19/147 73/754 |
| 2005/0241944 A1 * | 11/2005 | Dehe | ................... | H04R 19/005 205/112 |
| 2010/0140725 A1 | 6/2010 | Getman et al. | | |
| 2012/0264250 A1 * | 10/2012 | Graham | ................ | G01L 9/0042 257/E21.214 |
| 2014/0352445 A1 | 12/2014 | Kuisma | | |
| 2016/0313199 A1 | 10/2016 | Kazama et al. | | |

FOREIGN PATENT DOCUMENTS

| | | |
|---|---|---|
| JP | 2014511775 A | 5/2014 |
| WO | 2014191914 A1 | 12/2014 |
| WO | 2015076158 A1 | 5/2015 |

OTHER PUBLICATIONS

International Search Report in PCT/JP2021/011508, mailed Jun. 8, 2021, 3 pages.
Written Opinion in PCT/JP2021/011508, mailed Jun. 8, 2021, 4 pages.

* cited by examiner

*Primary Examiner* — Xin Y Zhong
(74) *Attorney, Agent, or Firm* — Keating & Bennett, LLP

(57) ABSTRACT

A sensor includes a detector including an element substrate, a membrane including an outer surface, an inner surface on an opposite side of the outer surface, and a diaphragm, a side wall provided on the element substrate and supporting a portion of the inner surface of the membrane outside the diaphragm, and a fixed electrode provided on the element substrate and surrounded by the side wall, facing the inner surface of the membrane with a space therebetween and having an electrostatic capacitance between the fixed electrode and the diaphragm. A first recess portion is provided in the outer surface of the membrane between the center of the diaphragm and the side wall in the thickness direction of the membrane.

15 Claims, 9 Drawing Sheets

SENSOR

CROSS REFERENCE TO RELATED APPLICATIONS

This application claims the benefit of priority to Japanese Patent Application No. 2020-057334 filed on Mar. 27, 2020 and is a Continuation Application of PCT Application No. PCT/JP2021/011508 filed on Mar. 19, 2021. The entire contents of each application are hereby incorporated herein by reference.

BACKGROUND OF THE INVENTION

1. Field of the Invention

The present invention relates to a sensor that detects a force such as pressure.

2. Description of the Related Art

For example, International Publication No. 2014/191914 discloses an electrostatic capacitance pressure sensor including a detection element including an element substrate, a fixed electrode provided on the element substrate, and a membrane including a diaphragm facing the fixed electrode with a space therebetween. A recess portion is provided in the central portion of the outer surface of the membrane. Accordingly, when the element substrate bends and deforms, the membrane bends and deforms such that the fixed electrode is substantially parallel to the inner surface of the diaphragm.

In the case of the electrostatic capacitance pressure sensor described in International Publication No. 2014/191914, however, when a compressive stress or a tensile stress in the planar direction of the membrane is applied to the detection element, that is, when the membrane is in a planar stress state, the deformation rigidity of the membrane including the diaphragm decreases or increases, thus changing the detection sensitivity of the sensor. An increase or decrease in the deformation rigidity in the planar stress state is referred to as the stress-stiffening effect.

SUMMARY OF THE INVENTION

Preferred embodiments of the present invention provide sensors for detecting a force, such as pressure, which each reduce or prevent changes in detection sensitivity that are caused when a membrane of the sensor is in a planar stress state.

A sensor according to a preferred embodiment of the present invention includes a detector including an element substrate, a membrane including an outer surface, an inner surface on an opposite side of the outer surface, and a diaphragm, a side wall provided on the element substrate, the side wall supporting a portion of the inner surface of the membrane outside the diaphragm, and a fixed electrode provided on the element substrate while being surrounded by the side wall, the fixed electrode facing the inner surface of the membrane with a space therebetween, an electrostatic capacitance being generated between the fixed electrode and the diaphragm, in which a first recess portion is provided in the outer surface of the membrane between a center of the diaphragm and the side wall in the thickness direction of the membrane.

According to preferred embodiments of the present invention, it is possible to reduce or prevent changes in a detection sensitivity that are caused when the membrane of the sensor for detecting a force, such as pressure, is in the planar stress state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
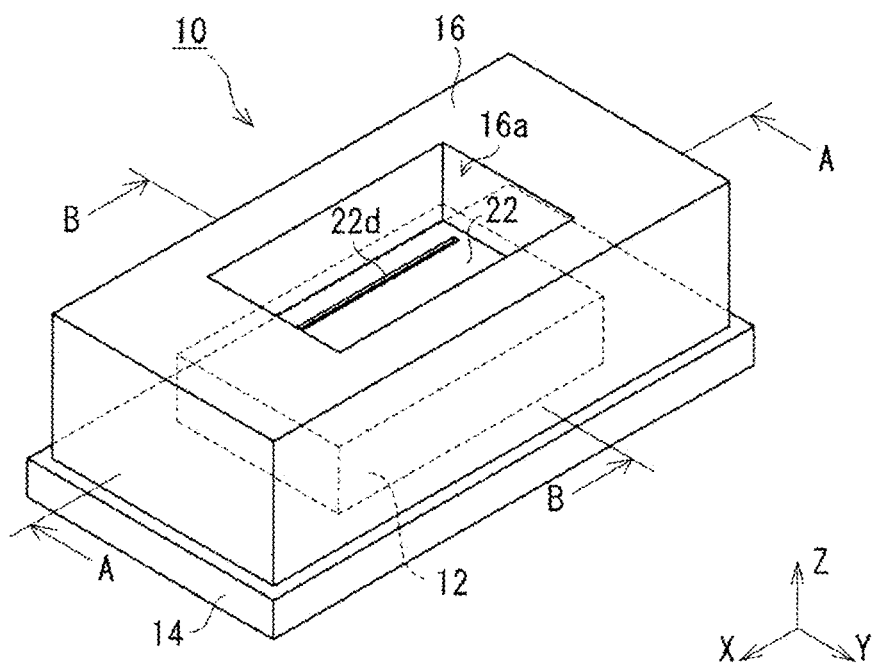
FIG. 1 is a perspective view of a sensor according to a first preferred embodiment of the present invention.

A sensor according to a preferred embodiment of the present invention includes a detector including an element substrate, a membrane including an outer surface, an inner surface on an opposite side of the outer surface, and a diaphragm, a side wall provided on the element substrate, the side wall supporting a portion of the inner surface of the membrane outside the diaphragm, and a fixed electrode provided on the element substrate while being surrounded by the side wall, the fixed electrode facing the inner surface of the membrane with a space therebetween, an electrostatic capacitance being generated between the fixed electrode and the diaphragm, in which a first recess portion is provided in the outer surface of the membrane between a center of the diaphragm and the side wall in the thickness direction of the membrane.

With such a configuration, it is possible to reduce or prevent changes in the detection sensitivity that are caused when the membrane of the sensor for detecting a force, such as pressure, is in a planar stress state.

For example, the first recess portion may be provided in the diaphragm along the side wall in the thickness direction.

For example, the first recess portion may have a linear shape extending continuously along the side wall in the thickness direction.

For example, the first recess portion may extend into a portion of the membrane supported by the side wall.

For example, a plurality of first recess portions may be provided to surround a center of the membrane in the thickness direction, the first recess portion being one of the plurality of first recess portions.

For example, a plurality of first recess portions may be provided symmetrically or substantially symmetrically with respect to the center of the membrane as a point of symmetry in the thickness direction, the first recess portion being one of the plurality of first recess portions.

For example, two first recess portions may be provided parallel or substantially parallel to each other to sandwich the center of the membrane in the thickness direction, the first recess portion being one of the two first recess portions.

For example, a first groove may be provided in a portion of a surface of the element substrate, the portion being in contact with the side wall.

For example, a second recess portion may be provided in a portion of the outer surface of the membrane, the portion overlapping the side wall in the thickness direction, and the second recess portion overlaps at least a portion of the first groove in the thickness direction.

For example, a second groove may be provided in the side wall and the second groove overlaps at least a portion of the first groove and overlaps at least a portion of the second recess portion in the thickness direction.

For example, the sensor may further include a package substrate on which the detector is mounted and a resin package provided on the package substrate, the resin package covering the detector, and the resin package may include an exposure hole through which a portion of the detector may be exposed to the outside.

Preferred embodiments of the present invention will be described below with reference to the drawings.

First Preferred Embodiment

Figure 2:
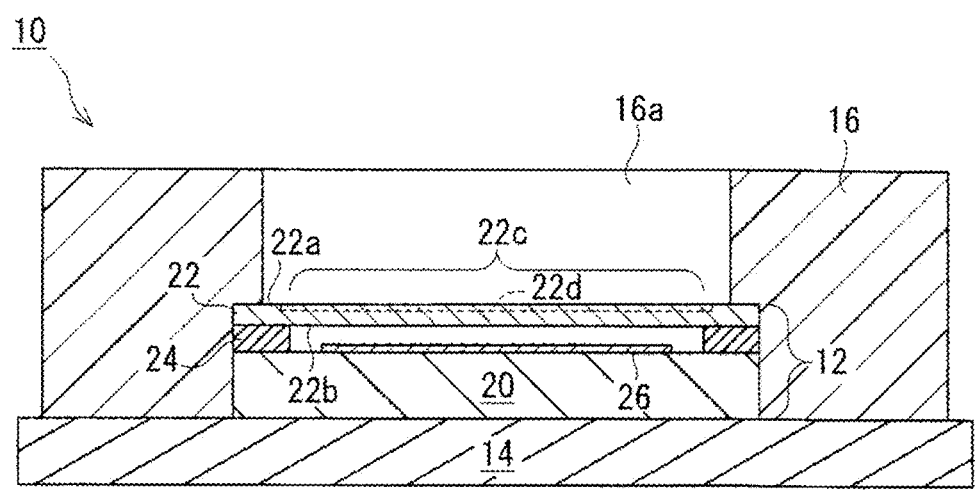
FIG. 2 is a sectional view of the sensor according to the first preferred embodiment of the present invention taken along line A-A in FIG. 1.
Figure 3:
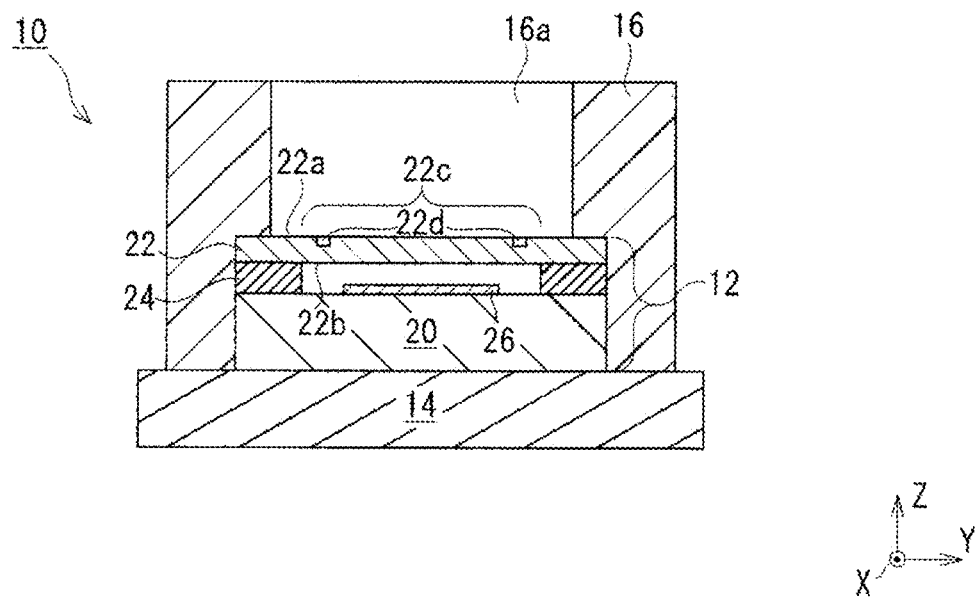
FIG. 3 is a sectional view of the sensor according to the first preferred embodiment of the present invention taken along line B-B in FIG. 1 illustrating.
Figure 4:
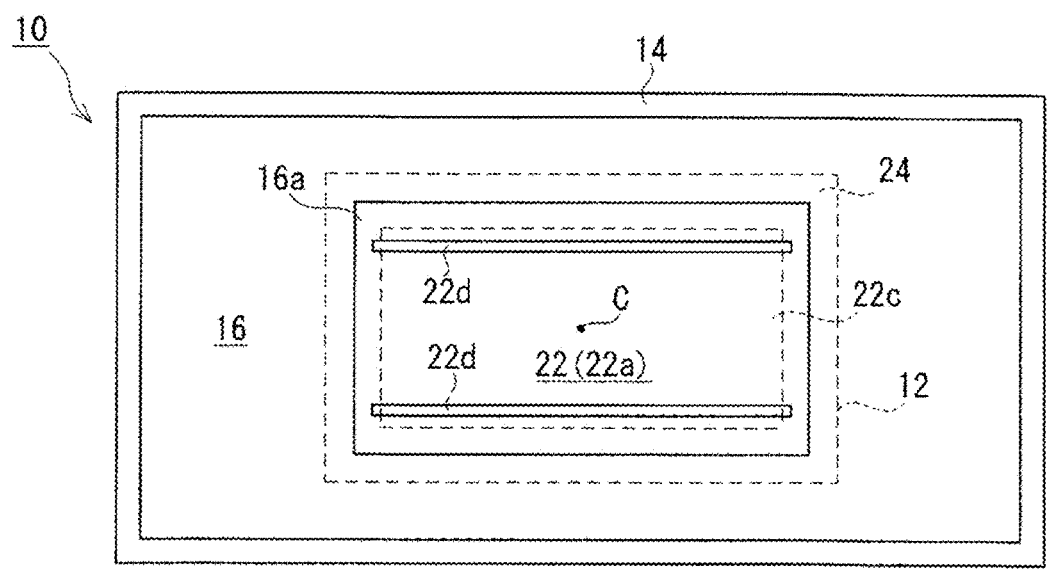
FIG. 4 is a top view of the sensor according to the first preferred embodiment of the present invention.

FIG. 1 is a perspective view of a sensor according to a first preferred embodiment of the present invention. FIG. 2 is a sectional view of the sensor according to the first preferred embodiment of the present invention taken along line A-A in FIG. 1. FIG. 3 is a sectional view of the sensor according to the first preferred embodiment of the present invention taken along line B-B in FIG. 1. FIG. 4 is a top view of the sensor according to the first preferred embodiment of the present invention. The XYZ Cartesian coordinate system illustrated in the drawings is used to facilitate understanding of the present invention and does not limit the present invention.

As illustrated in FIGS. 1 to 4, a sensor 10 includes a detector 12, a package substrate 14, and a resin package 16. The sensor 10 is an electrostatic capacitance pressure sensor and can detect pressure by using the detector 12. The detector 12 is mounted on the package substrate 14. The resin package 16 is provided on the package substrate 14 and includes an exposure hole 16a. The detector 12 is covered with the resin package 16 with a portion of the detector 12 exposed to the outside through the exposure hole 16a.

Figure 5:
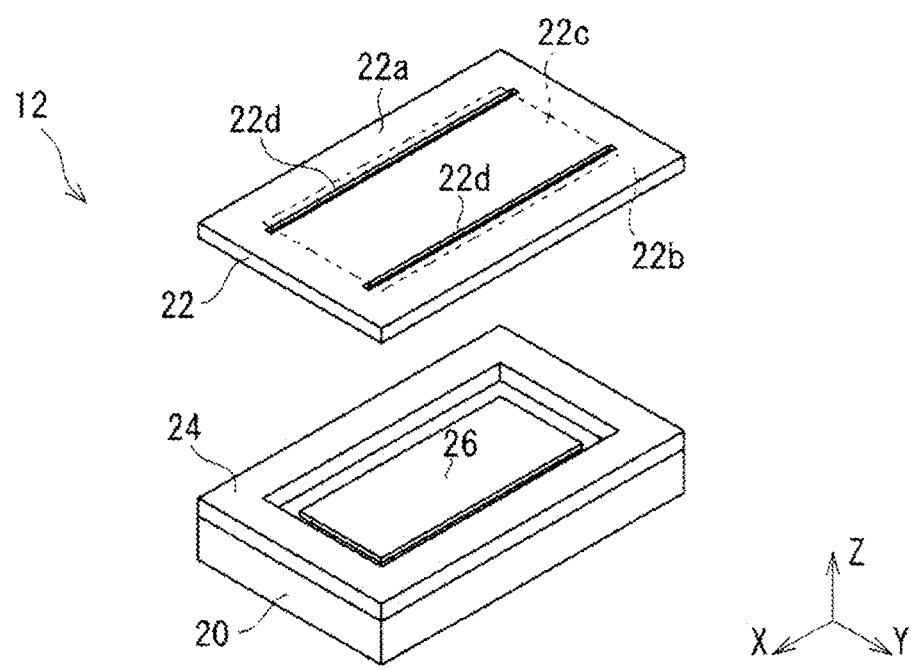
FIG. 5 is an exploded perspective view of a detector of the sensor according to the first preferred embodiment of the present invention.

FIG. 5 is an exploded perspective view of the detector of the sensor according to the first preferred embodiment of the present invention.

As illustrated in FIG. 5, the detector 12 includes an element substrate 20, a membrane 22, a side wall 24, and a fixed electrode 26.

The element substrate 20 is, for example, a silicon substrate and includes terminals (not illustrated) electrically connected to the package substrate 14.

The membrane 22 is a flexible thin plate member with a thickness of, for example, about 3.9 µm. The membrane 22 is conductive. In addition, the membrane 22 includes an outer surface 22a and an inner surface 22b. The pressure of a detection target acts on the outer surface 22a. The inner surface 22b is disposed on the opposite side of the outer surface 22a. The membrane 22 includes a diaphragm 22c. The diaphragm 22c deforms in a flexural manner when receiving pressure at the central portion thereof.

The side wall 24 is a frame provided on the element substrate 20. The side wall 24 is rectangular or substantially rectangular in the thickness direction of the membrane 22. The thickness direction of the membrane 22 is the Z-axis direction of the XYZ Cartesian coordinate system illustrated in the drawings. Accordingly, the thickness direction of the membrane 22 is the Z-axis direction. The side wall 24 is insulative. In addition, the side wall 24 supports the membrane 22.

Specifically, the side wall 24 supports the portion of the inner surface 22b of the membrane 22 outside the diaphragm 22c. This enables the diaphragm 22c to deform in a flexural manner in the thickness direction of the membrane 22. In other words, the portion of the membrane 22 that is not supported by the side wall 24 is the diaphragm 22c.

The fixed electrode 26 is provided on the element substrate 20 and is surrounded by the side wall 24. The fixed electrode 26 is made of, for example, conductive polysilicon. In addition, the fixed electrode 26 faces the inner surface 22b of the membrane 22 with a space therebetween. An electrostatic capacitance is generated between the fixed electrode 26 and the diaphragm 22c.

As illustrated in FIGS. 1 to 3, a portion of the outer surface 22a of the membrane 22, that is, the diaphragm 22c, is exposed to the outside through the exposure hole 16a of the resin package 16. This causes pressure to act on the diaphragm 22c.

When pressure acts on the portion of the outer surface 22a of the membrane 22 exposed to the outside, the diaphragm 22c deforms in a flexural manner toward the fixed electrode 26 according to the pressure. This changes the distance between the diaphragm 22c and the fixed electrode 26 and changes the absolute value of the electrostatic capacitance between the diaphragm 22c and the fixed electrode 26. The pressure acting on the outer surface 22a of the membrane 22 can be detected in accordance with the change in the absolute value of the electrostatic capacitance.

In addition, in the first preferred embodiment, a plurality of recess portions 22d are provided in the outer surface 22a of the membrane 22 as illustrated in FIG. 5. The recess portions 22d are first recess portions. Specifically, as illustrated in FIG. 4, the recess portions 22d are provided between the center C of the diaphragm 22c and the side wall 24 in the thickness direction of the membrane 22. In the first preferred embodiment, the recess portion 22d is a linear groove having a width of about 12 μm and a depth of about 0.8 μm, for example. The depth of the recess portion 22d is preferably about half or less the thickness of the membrane 22, more preferably about 25% or less thereof, to reduce or prevent rigidity of the membrane 22 from decreasing. In addition, the recess portion 22d is provided in the diaphragm 22c so as to extend continuously along the side wall 24 in the thickness direction of the membrane 22. Furthermore, the recess portion 22d extends to the longitudinal direction of the diaphragm 22c in the thickness direction of the membrane 22. The longitudinal direction of the diaphragm 22c is the X-axis direction of the XYZ Cartesian coordinate system illustrated in the drawings. In the first preferred embodiment, the recess portions 22d surround the center C of the membrane 22 symmetrically with respect to the center C as the point of symmetry. That is, in the first preferred embodiment, the two recess portions 22d are parallel or substantially parallel to each other at an equal or substantially equal distance from the center C to sandwich the center C.

It should be noted that the recess portions 22d extend to the outside of the diaphragm 22c, that is, the portion of the membrane 22 supported by the side wall 24 in the first preferred embodiment. Accordingly, even when the membrane 22 is provided at a position shifted from a desired position with respect to the side wall 24, the recess portions 22d are located within the region of the membrane 22 surrounded by the side wall 24, that is, within the diaphragm 22c in the thickness direction of the membrane 22.

The recess portions 22d reduce or prevent changes in the detection sensitivity that are caused when the membrane 22 is in the planar stress state. Specifically, as illustrated in FIGS. 1 to 3, a compressive stress or a tensile stress in the planar direction of the membrane 22 is applied to the detector 12 due to the thermal expansion or thermal contraction of the resin package 16, an external force acting on the resin package 16, or the like. The planar direction of the membrane 22 is the X-axis direction and the Y-axis direction of the XYZ Cartesian coordinate system illustrated in the drawings. This puts the membrane 22 in the planar stress state. The planar stress state of the membrane 22 will be described with reference to the drawings.

Figure 6A:
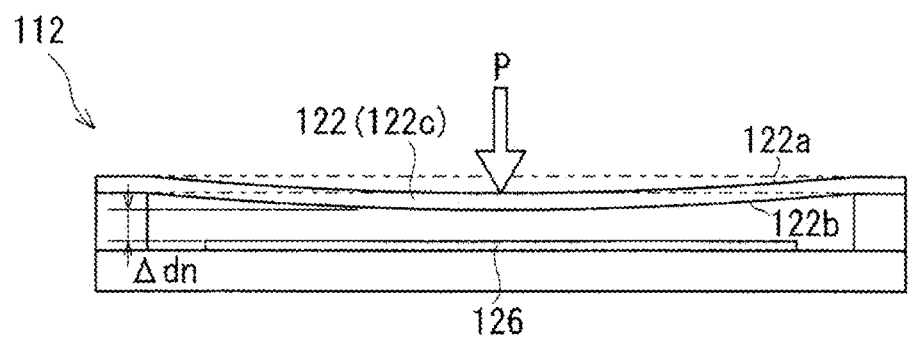
FIG. 6A is a sectional view of a detector of a sensor according to a comparative example when the detector is in a natural state.
Figure 6B:
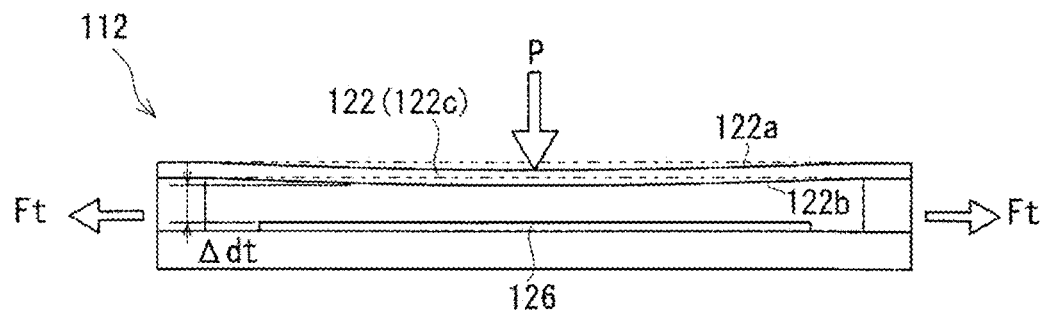
FIG. 6B is a sectional view of the detector of the sensor according to the comparative example when a tensile stress is applied to the detector.
Figure 6C:
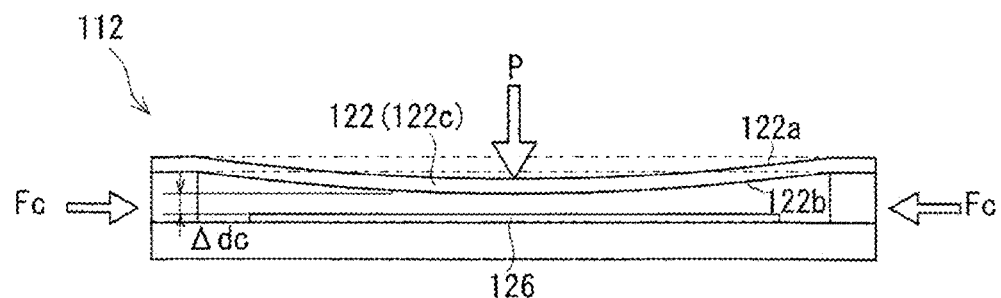
FIG. 6C is a sectional view of the detector of the sensor according to the comparative example when a compressive stress is applied to the detector.
Figure 7A:
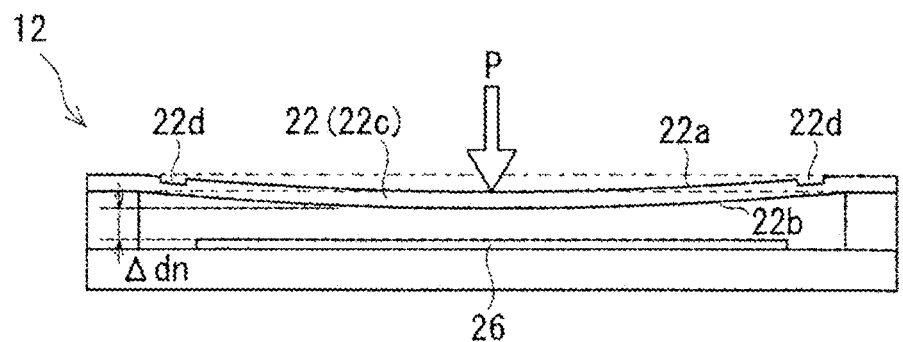
FIG. 7A is a sectional view of a detector of a sensor according to an example of a preferred embodiment of the present invention when the detector is in the natural state.
Figure 7B:
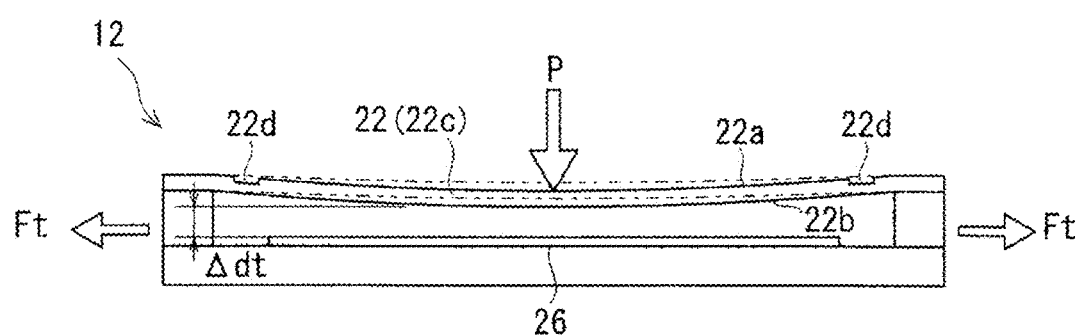
FIG. 7B is a sectional view of the detector of the sensor according to the example of a preferred embodiment of the present invention when a tensile stress is applied to the detector.
Figure 7C:
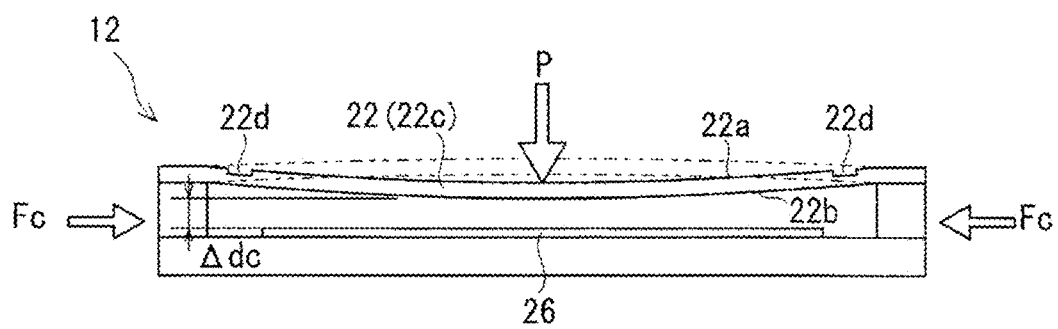
FIG. 7C is a sectional view of the detector of the sensor according to the example of a preferred embodiment of the present invention when a compressive stress is applied to the detector.

FIG. 6A is a sectional view of a detector of a sensor according to a comparative example when the detector is in a natural state. FIG. 6B is a sectional view of the detector of the sensor according to the comparative example when a tensile stress is applied to the detector. FIG. 6C is a sectional view of the detector of the sensor according to the comparative example when a compressive stress is applied to the detector. FIG. 7A is a sectional view of a detector of a sensor according to an example of a preferred embodiment of the present invention when the detector is in the natural state. FIG. 7B is a sectional view of the detector of the sensor according to the example of a preferred embodiment of the present invention when a tensile stress is applied to the detector. FIG. 7C is a sectional view of the detector of the sensor according to the example of a preferred embodiment of the present invention when a compressive stress is applied to the detector. Here, the natural state is a state in which a compressive stress or a tensile stress in the planar direction of the membrane is not applied to the detector, that is, a state in which the membrane is not in the planar stress state.

As illustrated in FIGS. 6A to 6C, in the detector 112 of the sensor according to the comparative example, no recess portions are provided in the outer surface 122a of the membrane 122.

In FIG. 6A, the dot-dash lines indicate the diaphragm 122c when the pressure P does not act on the outer surface 122a of the membrane 122 in the natural state, and the solid lines indicate the diaphragm 122c when the pressure P acts on the outer surface 122a of the membrane 122 in the natural state. As illustrated in FIG. 6A, the diaphragm 122c when the pressure P does not act on the outer surface 122a of the membrane 122 in the natural state is flat or substantially flat. Alternatively, as illustrated in FIG. 6A, the diaphragm 122c when the pressure P acts on the outer surface 122a of the membrane 122 in the natural state deforms in a flexural manner toward the fixed electrode 126. As a result, the distance Δdn between the diaphragm 122c and the fixed electrode 126 corresponds to the pressure P.

In FIG. 6B, the dot-dot-dash lines indicate the diaphragm 122c when the pressure P does not act on the outer surface 122a of the membrane 122 with a tensile stress Ft in the planar direction of the membrane 122 applied to the detector 112, that is, with the membrane 122 in the planar stress state due to the tensile stress Ft, and the solid lines indicate the diaphragm 122c when the pressure P acts on the outer surface 122a of the membrane 122. As illustrated in FIG. 6B, the diaphragm 122c when the pressure P does not act on the outer surface 122a of the membrane 122 with the membrane 122 in the planar stress state due to the tensile stress Ft is flat or substantially flat.

As illustrated in FIG. 6B, the diaphragm 122c when pressure P acts on the outer surface 122a of the membrane 122 with the membrane 122 in the planar stress state due to the tensile stress Ft deforms in a flexural manner toward the fixed electrode 126. However, the amount of deformation of the diaphragm 122c is smaller than in the natural state illustrated in FIG. 6A. As a result, the distance Δdt between the diaphragm 122c and the fixed electrode 126 is larger than the distance Δdn in the natural state illustrated in FIG. 6A even though the same or substantially the same pressure P acts on the membrane 122.

That is, when the tensile stress Ft in the planar direction of the membrane 122 is applied to the detector 112, the deformation rigidity in the thickness direction of the membrane 122 is larger than in the natural state, and the membrane 122 is not easily deformed in the thickness direction.

In FIG. 6C, the dot-dot-dash lines indicate the diaphragm 122c when the pressure P does not act on the outer surface 122a of the membrane 122 with the compressive stress Fc in the planar direction of the membrane 122 applied to the detector 112, that is, with the membrane 122 in the planar stress state due to the compressive stress Fc, and the solid lines indicate the diaphragm 122c when the pressure P acts on the outer surface 122a of the membrane 122. As illustrated in FIG. 6C, the diaphragm 122c when the pressure P does not act on the outer surface 122a of the membrane 122 with the membrane 122 in the planar stress state due to the compressive stress Fc is flat or substantially flat.

As illustrated in FIG. 6C, the diaphragm 122c when the pressure P acts on the outer surface 122a of the membrane 122 with the membrane 122 in the planar stress state due to the compressive stress Fc deforms in a flexural manner toward the fixed electrode 126. However, the amount of deformation of the diaphragm 122c is larger than in the natural state illustrated in FIG. 6A. As a result, even though the same or substantially the same pressure P acts on the membrane 122, the distance Δdc between the diaphragm 122c and the fixed electrode 126 is smaller than the distance Δdn in the natural state illustrated in FIG. 6A.

That is, when the compressive stress Fc in the planar direction of the membrane 122 is applied to the detector 112, the deformation rigidity in the thickness direction of the membrane 122 is smaller than in the natural state, and the membrane 122 is easily deformed in the thickness direction.

An increase or decrease in the deformation rigidity in the thickness direction of the membrane 122 as described above when the tensile stress or the compressive stress is applied to the membrane 122 in the planar direction of the membrane 122, that is, when the membrane 122 is put in the planar stress state, is referred to as the stress-stiffening effect.

As illustrated in FIGS. 6A to 6C, in the detector 112 of the sensor according to the comparative example, the distance between the diaphragm 122c and the fixed electrode 126 differs depending on whether the detector 112 is the natural state or the membrane 122 is in the planar stress state even though the same or substantially the same pressure P acts on the membrane 122. In addition, even when the membrane 122 is in the planar stress state, the distance between the diaphragm 122c and the fixed electrode 126 differs depending on whether the stress to be applied is a tensile stress or a compressive stress, that is, depending on the direction of the stress generated in the membrane 122. As described above, in the detector 112 of the sensor according to the comparative example, the detection sensitivity when the membrane 122 is in the planar stress state changes from the detection sensitivity when the membrane 122 is in the natural state.

Since the plurality of recess portions 22d are provided in the diaphragm 22c in the first preferred embodiment, changes in the detection sensitivity are reduced or prevented even when the membrane 22 is in the planar stress state. This will be described with reference to FIGS. 7A to 7C.

In FIG. 7A, the dot-dash lines indicate the diaphragm 22c when the pressure P does not act on the outer surface 22a of the membrane 22 in the natural state, and the solid lines indicate the diaphragm 22c when the pressure P acts on the outer surface 22a of the membrane 22 in the natural state. As illustrated in FIG. 7A, the diaphragm 22c when the pressure P does not act on the outer surface 22a of the membrane 22 in the natural state is flat or substantially flat. In addition, as illustrated in FIG. 7A, the diaphragm 22c when the pressure P acts on the outer surface 22a of the membrane 22 in the natural state deforms in a flexural manner toward the fixed electrode 26. As a result, the distance Δdn between the diaphragm 22c and the fixed electrode 26 corresponds to the pressure P.

In FIG. 7B, the dot-dot-dash lines indicate the diaphragm 122c when the pressure P does not act on the outer surface 122a of the membrane 122 with the tensile stress Ft in the planar direction of the membrane 22 applied to the detector 112, that is, with the membrane 22 in the planar stress state due to the tensile stress Ft, and the solid lines indicate the diaphragm 122c when the pressure P acts on the outer surface 122a of the membrane 122. As illustrated in FIG. 7B, the diaphragm 22c when the pressure P does not act on the outer surface 22a of the membrane 22 with the membrane 22 in the planar stress state due to the tensile stress Ft deforms slightly in a flexural manner toward the fixed electrode 26. This flexural deformation is caused by the difference between the distribution of the tensile stress on the outer surface 22a of the membrane 22 and the distribution of the tensile stress on the inner surface 22b.

Specifically, the tensile stress generated in the region of the outer surface 22a sandwiched between the plurality of recess portions 22d is smaller than the tensile stress generated in the region of the inner surface 22b on the opposite side of the region of the outer surface 22a.

Accordingly, the membrane 22 is distorted such that the region of the inner surface 22b is distorted more than the region of the inner surface 22b. As a result, the diaphragm 22c deforms slightly in a flexural manner such that the inner surface 22b projects.

The diaphragm 22c deforms slightly in a flexural manner such that the inner surface 22b projects as described above, thus increasing the absolute value of the electrostatic capacitance between the diaphragm 22c and the fixed electrode 26. In addition, the diaphragm 22c deforms easily in a flexural manner toward the fixed electrode 26.

The diaphragm 22c when the pressure P acts on the outer surface 22a of the membrane 22 with the membrane 22 in the planar stress state due to the tensile stress Ft as illustrated in FIG. 7B deforms in a flexural manner toward the fixed electrode 26 as in the natural state illustrated in FIG. 7A. The amount of deformation of the diaphragm 22c is the same or almost the same as in the natural state illustrated in FIG. 7A. When the sectional shape, the width, the depth, and the like of the recess portion 22d are appropriate as described above, the distance Δdt between the diaphragm 22c and the fixed electrode 26 when the same or substantially the same pressure P acts on the membrane 22 is the same or substantially the same as the distance Δdn in the natural state illustrated in FIG. 7A.

In FIG. 7C, the dot-dot-dash lines indicate the diaphragm 22c when the pressure P does not act on the outer surface 22a of the membrane 22 with the compressive stress Fc in the planar direction of the membrane 22 applied to the detector 112, that is, with the membrane 22 in the planar stress state due to the compressive stress Fc, and the solid lines indicate the diaphragm 22c when the pressure P acts on the outer surface 22a of the membrane 22. As illustrated in FIG. 6C, the diaphragm 22c when the pressure P does not act on the outer surface 22a of the membrane 22 with the membrane 22 in the planar stress state due to the compressive stress Fc deforms slightly in a flexural manner to the opposite side of the fixed electrode 26, that is, the outer side. This flexural deformation is caused by the difference between the distribution of the compressive stress on the outer surface 22a of the membrane 22 and the distribution of the compressive stress on the inner surface 22b of the membrane 22.

Specifically, the compressive stress generated in the region of the outer surface 22a sandwiched between the plurality of recess portions 22d is smaller than the compressive stress generated in the region of the inner surface 22b on the opposite side of the region of the outer surface 22a. Accordingly, the region of the inner surface 22b is distorted in the direction in which the region of the inner surface 22b shrinks more than the region of the outer surface 22a. As a result, the diaphragm 22c deforms slightly in a flexural manner such that the inner surface 22b becomes recessed.

The diaphragm 22c deforms slightly in a flexural manner such that the inner surface 22b becomes recessed as described above, thus reducing the absolute value of the electrostatic capacitance between the diaphragm 22c and the fixed electrode 26. In addition, the diaphragm 22c does not easily deform in a flexural manner toward the fixed electrode 26.

As illustrated in FIG. 7C, the diaphragm 22c when the pressure P acts on the outer surface 22a of the membrane 22 with the membrane 22 in the planar stress state due to the compressive stress Fc deforms in a flexural manner toward the fixed electrode 26 as in the natural state illustrated in FIG. 7A. The amount of deformation of the diaphragm 22c is the same or substantially the same as in the natural state illustrated in FIG. 7A. When the sectional shape, the width, the depth, and the like of the recess portion 22d are appropriate as described above, the distance $\Delta dc$ between the diaphragm 22c and the fixed electrode 26 when the same or substantially the same pressure P acts on the membrane 22 is the same or substantially the same as the distance $\Delta dn$ in the natural state illustrated in FIG. 7A.

Since the recess portions 22d are provided in the outer surface 22a of the membrane 22 as illustrated in FIGS. 7A to 7C, the distance between the diaphragm 22c and the fixed electrode 26 is the same or substantially the same when the same pressure P acts on the membrane 22 regardless of whether the detector is in the natural state or the membrane 22 is in the planar stress state and regardless of whether the tensile stress or the compressive stress is applied, that is, regardless of the direction of the stress generated in the membrane 22 even if the membrane 22 is in the planar stress state. That is, in the detector 12 of the sensor 10 according to the first preferred embodiment, even when the membrane 22 is in the planar stress state, the detection sensitivity in the natural state hardly changes, and changes in the detection sensitivity can be reduced or prevented.

The secondary advantageous effect is that the diaphragm 22c is locally thinned and deforms easily because the recess portions 22d are provided in the outer surface 22a of the membrane 22. As a result, the detection sensitivity increases, and noise in the signal output from the sensor 10 is reduced.

According to the first preferred embodiment as described above, it is possible to reduce or prevent changes in the detection sensitivity that are caused when the membrane 22 of the sensor 10 for detecting pressure is in the planar stress state.

Second Preferred Embodiment

A second preferred embodiment of the present invention is a modification of the first preferred embodiment described above. Accordingly, a sensor according to the second preferred embodiment will be described focusing on the differences from the first preferred embodiment described above.

Figure 8:
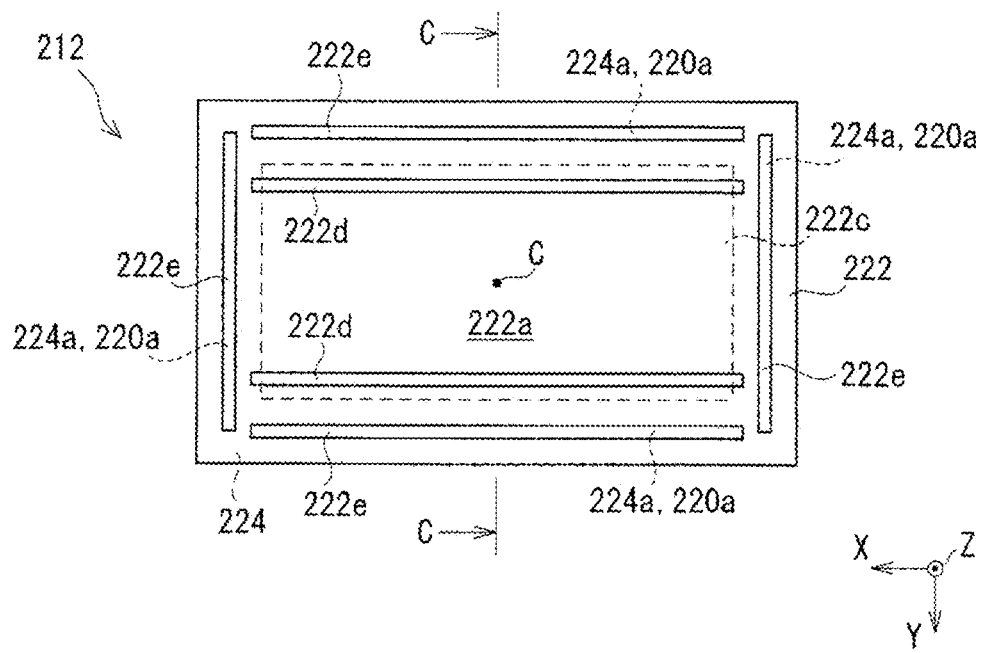
FIG. 8 is a top view of a detector of a sensor according to a second preferred embodiment of the present invention.
Figure 9:
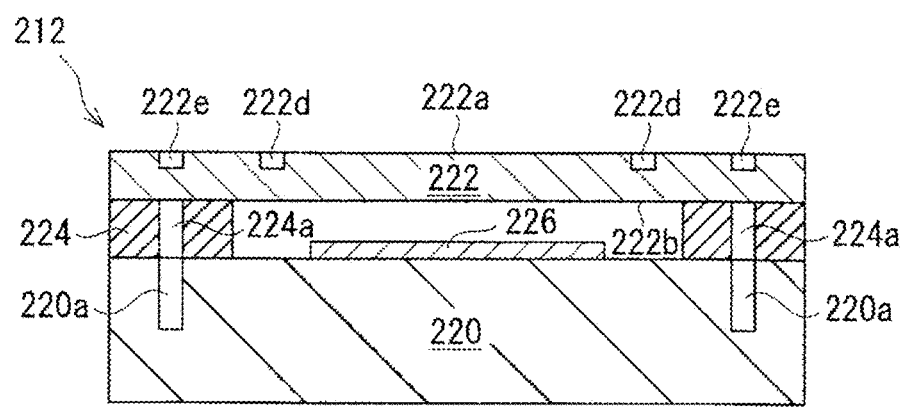
FIG. 9 is a sectional view of the detector of the sensor according to the second preferred embodiment of the present invention taken along line C-C in FIG. 8.

FIG. 8 is a top view of a detector of the sensor according to the second preferred embodiment of the present invention. FIG. 9 is a sectional view of the detector of the sensor according to the second preferred embodiment of the present invention taken along line C-C in FIG. 8.

As illustrated in FIGS. 8 and 9, in a detector 212 of the sensor according to the second preferred embodiment, a plurality of grooves 220a are provided in an element substrate 220. The grooves 220a are provided in portions of the surface of the element substrate 220 that are in contact with a side wall 224 to surround a fixed electrode 226. The grooves 220a are first grooves.

In addition, in the second preferred embodiment, a plurality of recess portions 222e in addition to a plurality of recess portions 222d are provided in an outer surface 222a of a membrane 222. The recess portions 222d are the first recess portions and the recess portions 222e are second recess portions.

Specifically, as illustrated in FIG. 8, the recess portions 222e are provided in the portions of the membrane 222 around the diaphragm 222c, that is, the portions of the membrane 222 that overlap the side wall 224 in the thickness direction of the membrane 222. The thickness direction of the membrane 222 is the Z-axis direction of the XYZ Cartesian coordinate system illustrated in the drawings. Accordingly, the thickness direction view of the membrane 222 is the Z-axis direction view. Furthermore, the recess portions 222e overlap at least portions of the grooves 220a in the thickness direction of the membrane 222.

Furthermore, as illustrated in FIG. 9, a plurality of grooves 224a are provided in the side wall 224 in the second preferred embodiment. The grooves 224a penetrate through the side wall 224 in the thickness direction of the membrane 222. The grooves 224a overlap at least portions of the grooves 220a and overlap at least portions of the recess portions 222e in the thickness direction of the membrane 222. The grooves 224a are the second grooves.

As illustrated in FIG. 8, the grooves 220a, the recess portions 222e, and the grooves 224a surround the diaphragm 222c in the thickness direction of the membrane 222. Accordingly, the grooves 220a, the recess portions 222e, and the grooves 224a define and function as dampers that reduce a force transmitted to the diaphragm 222c by absorbing a compressive stress or a tensile stress in the planar direction of the membrane 222 when the compressive stress or the tensile stress is applied to the detector 12. As a result, the stress generated in the diaphragm 222c is reduced, and changes in the detection sensitivity are further reduced or prevented even when the membrane 222 is in the planar stress state. The planar direction of the membrane 222 is the X-axis direction and the Y-axis direction of the XYZ Cartesian coordinate system illustrated in the drawings.

The element substrate 220 may be thickened to further reduce the stress generated in the diaphragm 222c. Accordingly, the element substrate 220 can have rigidity against a compressive stress or a tensile stress in the planar direction. As a result, the stress generated in the diaphragm 222c is further reduced.

In addition, the grooves 220a, the recess portions 222e, and the grooves 224a may be, for example, annular in the thickness direction of the membrane 222. That is, the numbers and the shapes of the grooves 220a, the recess portions 222e, and the grooves 224a are not limited as long as the grooves 220a, the recess portions 222e, and grooves 224a are provided at positions on the outer side of the diaphragm 222c in the thickness direction of the membrane 222.

According to the second preferred embodiment described above, it is possible to reduce or prevent changes in the detection sensitivity that are caused when the membrane 222 of the sensor for detecting pressure is in the planar stress state as in the first preferred embodiment described above.

Preferred embodiments of the present invention have been described above, but preferred embodiments of the present invention are not limited to these preferred embodiments.

For example, in the first preferred embodiment described above, the two recess portions 22d are parallel or substantially parallel to each other at an equal or substantially equal distance from the center C of the membrane 22 as illustrated in FIG. 4. However, the preferred embodiments of the present invention are not limited to this example. Recess portions provided in the membrane can be arranged in various configurations.

Figure 10:
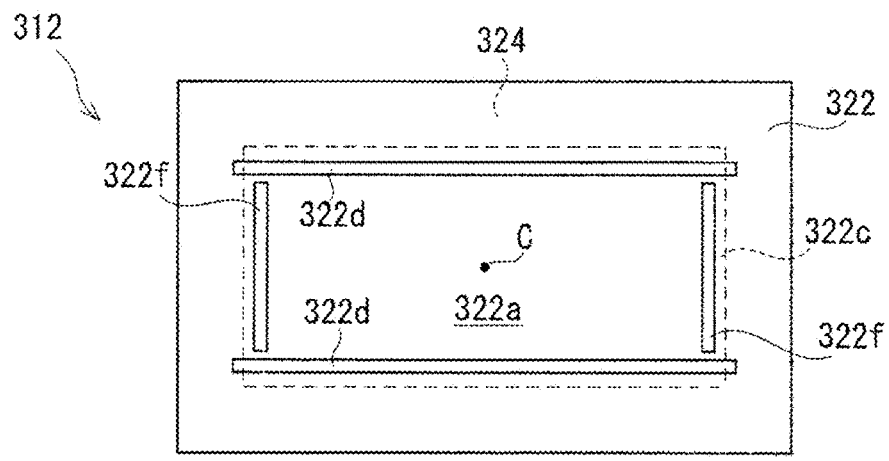
FIG. 10 is a top view of a detector of a sensor according to a third preferred embodiment of the present invention.
Figure 10:
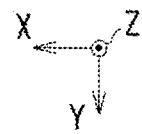

FIG. 10 is a top view of a detector of a sensor according to a third preferred embodiment of the present invention.

Figure 11:
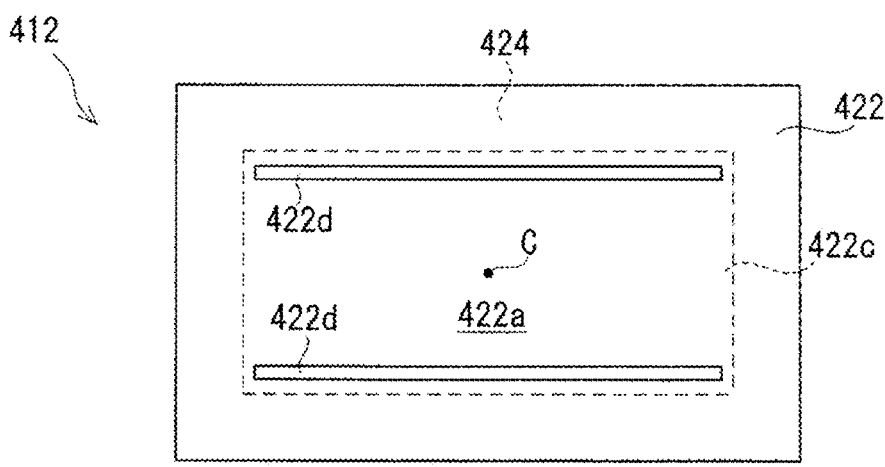
FIG. 11 is a top view of a detector of a sensor according to a fourth preferred embodiment of the present invention.
Figure 11:
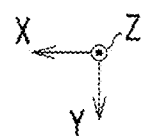
Figure 12:
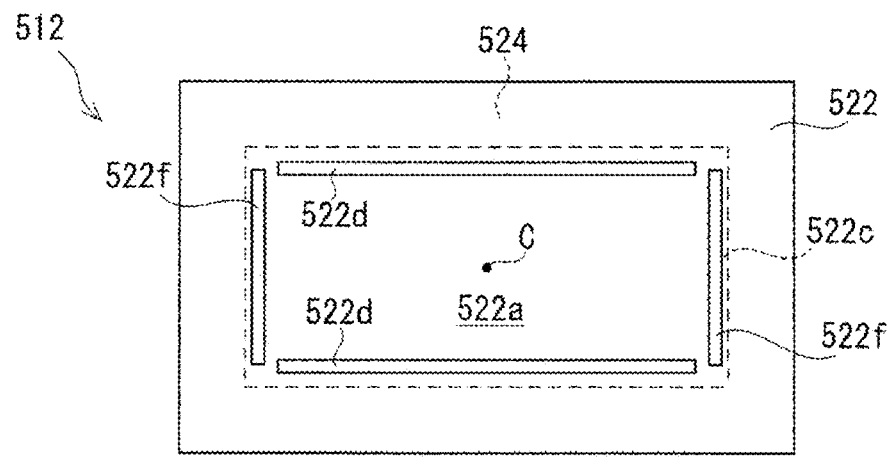
FIG. 12 is a top view of a detector of a sensor according to a fifth preferred embodiment of the present invention.
Figure 12:
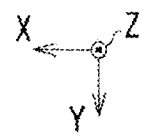
Figure 13:
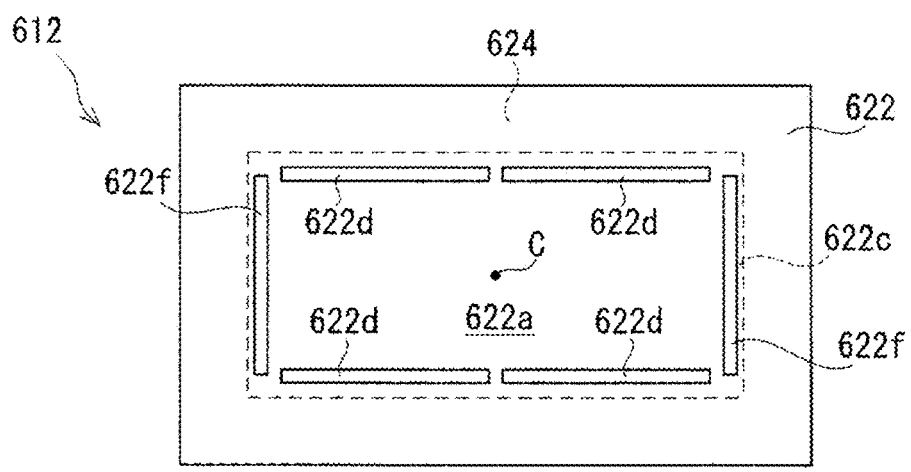
FIG. 13 is a top view of a detector of a sensor according to a sixth preferred embodiment of the present invention.
Figure 13:
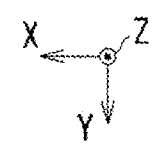
Figure 14:
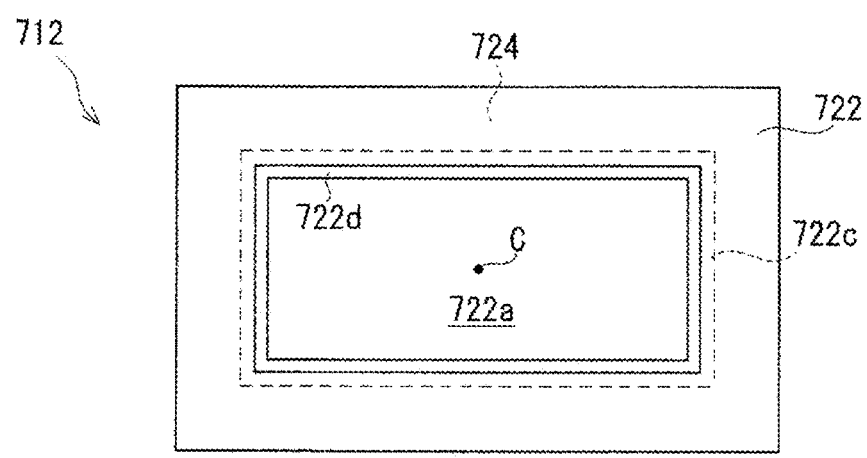
FIG. 14 is a top view of a detector of a sensor according to a seventh preferred embodiment of the present invention.
Figure 14:
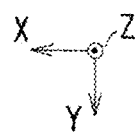

FIG. 11 is a top view of a detector of a sensor according to a fourth preferred embodiment of the present invention. FIG. 12 is a top view of a detector of a sensor according to a fifth preferred embodiment of the present invention. FIG. 13 is a top view of a detector of a sensor according to a sixth preferred embodiment of the present invention. FIG. 14 is a top view of a detector of a sensor according to a seventh preferred embodiment of the present invention.

As illustrated in FIG. 10, in a detector 312 of the sensor according to the third preferred embodiment of the present invention, two recess portions 322d and two recess portions 322f are provided in an outer surface 322a of a membrane 322. Specifically, as illustrated in FIG. 10, the recess portions 322d and 322f are provided between the center C of the diaphragm 322c and the side wall 324 in the thickness direction of the membrane 322. The recess portions 322d and 322f are provided in the diaphragm 322c along the side wall 324 in the thickness direction of the membrane 322. The recess portions 322d and 322f surround the center C of the membrane 322. The recess portions 322d and 322f are first recess portions.

The recess portions 322d extend in the longitudinal direction of the diaphragm 322c in the thickness direction of the membrane 322. The longitudinal direction of the diaphragm 322c is the X-axis direction of the XYZ Cartesian coordinate system illustrated in the drawing. The recess portions 322d extend to the outer side portion of the diaphragm 322c, that is, the portion of the membrane 322 supported by the side wall 324. The recess portions 322d are provided symmetrically or substantially symmetrically with respect to the center C as the point of symmetry. That is, the two recess portions 322d are parallel or substantially parallel to each other at an equal or substantially equal distance from the center C.

The recess portions 322f extend in the transverse direction of the diaphragm 322c in the thickness direction of the membrane 322. The transverse direction of the diaphragm 322c is the Y-axis direction of the XYZ Cartesian coordinate system illustrated in the drawing. The recess portions 322f are provided symmetrically or substantially symmetrically with respect to the center C as the point of symmetry. That is, the two recess portions 322f are parallel or substantially parallel to each other at an equal or substantially equal distance from the center C.

As illustrated in FIG. 11, in a detector 412 of the sensor according to the fourth preferred embodiment of the present invention, two recess portions 422d are provided in an outer surface 422a of a membrane 422. The entire or substantially the entire recess portions 422d are located within the diaphragm 422c.

As illustrated in FIG. 12, in a detector 512 of the sensor according to the fifth preferred embodiment of the present invention, two recess portions 522d and two recess portions 522f are provided in an outer surface 522a of a membrane 522. Specifically, as illustrated in FIG. 12, the recess portions 522d and 522f are provided between the center C of the diaphragm 522c and the side wall 524 in the thickness direction of the membrane 522. The recess portions 522d and 522f are provided in the diaphragm 522c along the side wall 524 in the thickness direction of the membrane 522. The recess portions 522d and 522f surround the center C of the membrane 522. The recess portions 522d and 522f are first recess portions. The entire or substantially the entire recess portions 522d and 522f are located within the diaphragm 522c.

The recess portions 522d extend in the longitudinal direction of the diaphragm 522c in the thickness direction of the membrane 522. The longitudinal direction of the diaphragm 522c is the X-axis direction of the XYZ Cartesian coordinate system illustrated in the drawing. The recess portions 522d are provided symmetrically or substantially symmetrically with respect to the center C as the point of symmetry. That is, the two recess portions 322d are parallel or substantially parallel to each other at an equal distance from the center C.

The recess portions 522f extend in the transverse direction of the diaphragm 522c in the thickness direction of the membrane 522. The transverse direction of the diaphragm 522c is the Y-axis direction of the XYZ Cartesian coordinate system illustrated in the drawing. The recess portions 522f are provided symmetrically or substantially symmetrically with respect to the center C as the point of symmetry. That is, the two recess portions 522f are parallel or substantially parallel to each other at an equal or substantially equal distance from the center C.

As illustrated in FIG. 13, in a detector 612 of the sensor according to the sixth preferred embodiment of the present invention, four recess portions 622d and two recess portions 622f are provided in an outer surface 622a of a membrane 622. Specifically, as illustrated in FIG. 13, the recess portions 622d and 622f are provided between the center C of the diaphragm 622c and the side wall 624 in the thickness direction of the membrane 622. The recess portions 622d and 622f are provided in the diaphragm 622c along the side wall 624 in the thickness direction of the membrane 622. The recess portions 622d and 622f surround the center C of the membrane 622. The recess portions 622d and 622f are first recess portions. The entire or substantially the entire recess portions 622d and 622f are located within the diaphragm 622c.

The recess portions 622d extend in the longitudinal direction of the diaphragm 622c in the thickness direction of the membrane 622. The longitudinal direction of the diaphragm 622c is the X-axis direction of the XYZ Cartesian coordinate system illustrated in the drawing. The recess portions 622d are provided symmetrically or substantially symmetrically with respect to the center C as the point of symmetry. That is, the four recess portions 622d are parallel or substantially parallel to each other at an equal or substantially equal distance from the center C.

The recess portions 622f extend in the transverse direction of the diaphragm 622c in the thickness direction of the membrane 622. The transverse direction of the diaphragm 622c is the Y-axis direction of the XYZ Cartesian coordinate system illustrated in the drawing. The recess portions 622f are provided symmetrically or substantially symmetrically with respect to the center C as the point of symmetry. That is, the two recess portions 622f are parallel or substantially parallel to each other at an equal or substantially equal distance from the center C.

As illustrated in FIG. 14, in a detector 712 of the sensor according to the seventh preferred embodiment of the present invention, a recess portion 722d is provided in an outer surface 722a of a membrane 722. Specifically, as illustrated in FIG. 14, the recess portion 722d is provided between the center C of a diaphragm 722c and a side wall 724 in the thickness direction of the membrane 722. The recess portion 722d is provided in the diaphragm 722c along the side wall 724 in the thickness direction of the membrane 722. The recess portion 722d is annular in the thickness direction of the membrane 722 and surrounds the center C of the membrane 722. The recess portion 722d is a first recess portion. The entire or substantially the entire recess portion 722d is located within the diaphragm 722c.

That is, in the present preferred embodiment of the present invention, the first recess portion is provided in a portion of the outer surface between the center of the diaphragm and the side wall in the thickness direction of the membrane.

In addition, preferably, the first recess portion is provided in a portion close to the side wall, that is, provided along the side wall in the thickness direction of the membrane, instead of a portion close to the center of the diaphragm. This can efficiently reduce or prevent changes in the detection sensitivity that are caused when the membrane is in the planar stress state. In contrast, when the first recess portion is disposed in a portion close to the center, the difference between the stress distribution on the outer surface of the diaphragm and the stress distribution on the inner surface of the diaphragm of the membrane in the planar stress state decreases and the effect of the first recess portion is reduced.

More preferably, a plurality of first recess portions are provided to surround the center of the membrane in the thickness direction of the membrane. This enables the diaphragm to deform in a flexural manner into a shape symmetrical or substantially symmetrical with respect to the center thereof.

Still more preferably, a plurality of first recess portions are provided symmetrically or substantially symmetrically with respect to the center of the membrane as the point of symmetry in the thickness direction of the membrane. This enables the diaphragm to deform in a flexural manner into a shape more symmetrical with respect to the center thereof.

In addition, for example, in the first preferred embodiment described above, the sensor 10 is an electrostatic capacitance pressure sensor. However, the preferred embodiments of the present invention are not limited to this example. For example, the sensor may be a piezo resistance pressure sensor with an electrical resistance that changes when the membrane deforms when receiving pressure. In addition, the sensor is not limited to a sensor that detect pressure, but may be a sensor that detects the vibration and force applied to the membrane based on the amount of deformation of the membrane, such as, for example, a differential pressure sensor or a force sensor.

In addition, in the first preferred embodiment described above, the detector 12 is covered with the resin package 16 as illustrated in FIG. 1. However, preferred embodiments of the present invention are not limited to this example. The sensor according to the present invention only needs to have a structure in which a tensile stress or a compressive stress in the planar direction of the membrane can act on the detector.

That is, in a broad sense, a sensor according to a preferred embodiment of the present invention includes the detector including the element substrate, the membrane including the outer surface, the inner surface on the opposite side of the outer surface, and the diaphragm, and the side wall, provided on the element substrate, that supports a portion of the inner surface of the membrane outside the diaphragm, in which the first recess portion is provided in the outer surface of the membrane between the center of the diaphragm and the side wall in the thickness direction of the membrane.

Preferred embodiments of the present invention have been described above, but it is apparent for those skilled in the art that other preferred embodiments of the present invention can be obtained by entirely or partially combining preferred embodiments with at least one other preferred embodiment.

Preferred embodiments of the present invention are applicable to sensors that each detect pressure or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor comprising:
a detector including an element substrate, a membrane including an outer surface, an inner surface on an opposite side of the outer surface, and a diaphragm, a side wall provided on the element substrate, the side wall supporting a portion of the inner surface of the membrane outside the diaphragm, and a fixed electrode provided on the element substrate and surrounded by the side wall, the fixed electrode facing the inner surface of the membrane with a space therebetween, and an electrostatic capacitance being generated between the fixed electrode and the diaphragm; wherein
a first recess portion is provided in the outer surface of the membrane between a center of the diaphragm and the side wall in a thickness direction of the membrane;
a first groove is provided in a portion of a surface of the element substrate, the portion being in contact with the side wall;
a second recess portion is provided in a portion of the outer surface of the membrane, the second recess portion overlapping the side wall in the thickness direction, and the second recess portion overlaps at least a portion of the first groove in the thickness direction; and
a second groove is provided in the side wall and the second groove overlaps at least a portion of the first groove and overlaps at least a portion of the second recess portion in the thickness direction.

2. The sensor according to claim 1, wherein the first recess portion is provided in the diaphragm along the side wall in the thickness direction.

3. The sensor according to claim 2, wherein the first recess portion has a linear shape extending continuously along the side wall in the thickness direction.

4. The sensor according to claim 3, wherein the first recess portion extends into a portion of the membrane supported by the side wall.

5. The sensor according to claim 1, wherein a plurality of first recess portions surround a center of the membrane in the thickness direction, the first recess portion being one of the plurality of first recess portions.

6. The sensor according to claim 1, wherein the plurality of first recess portions are provided symmetrically or substantially symmetrically with respect to the center of the membrane as a point of symmetry in the thickness direction.

7. The sensor according to claim 5, wherein two first recess portions are provided parallel or substantially parallel to each other to sandwich the center of the membrane in the thickness direction, the first recess portion being one of the two first recess portions.

8. The sensor according to claim 1, further comprising:
a package substrate on which the detector is mounted; and
a resin package provided on the package substrate, the resin package covering the detector; wherein
the resin package includes an exposure hole through which a portion of the detector is exposed to an outside.

9. The sensor according to claim 1, wherein the membrane is a flexible thin plate with a thickness of about 3.9 μm.

10. The sensor according to claim 1, wherein the side wall has a rectangular or substantially rectangular shape.

11. The sensor according to claim 1, wherein the fixed electrode is made of conductive polysilicon.

12. The sensor according to claim 7, wherein each of the two first recess portions is a linear groove.

13. The sensor according to claim 12, wherein the linear groove has a width of about 12 μm and a depth of about 0.8 μm.

14. The sensor according to claim 12, wherein a depth of the linear groove is about half or less of a thickness of the membrane.

15. The sensor according to claim 12, wherein a depth of the linear groove is about 25% or less of a thickness of the membrane.

* * * * *